Sept. 13, 1938.  J. VISMAN  2,130,254
METHOD OF MOLDING TUBULAR MEMBERS
Filed July 2, 1935
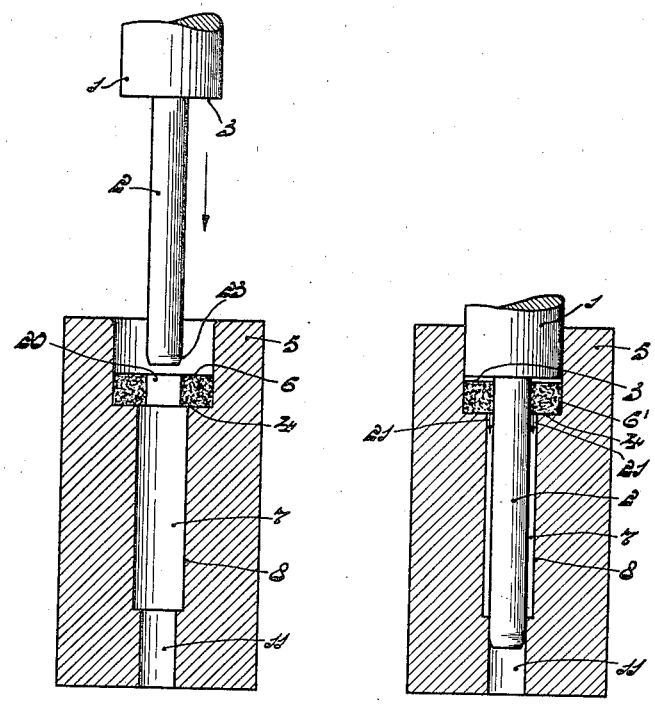
Fig. 1
Fig. 2
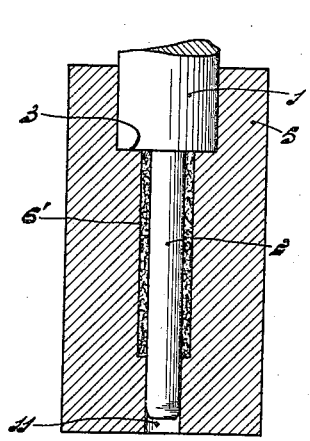
Fig. 3
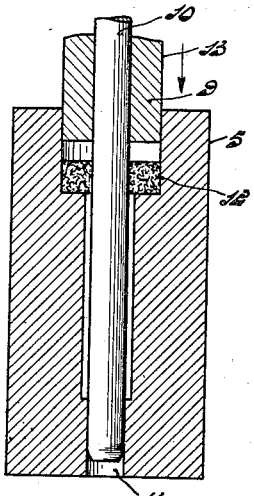
Fig. 4
INVENTOR
JEAN VISMAN
BY
ATTORNEY Patented Sept. 13, 1938

2,130,254

UNITED STATES PATENT OFFICE 2,130,254

METHOD OF MOLDING TUBULAR MEMBERS

Jean Visman, Eindhoven, Netherlands, assignor to N. V. Philips' Gloeilampenfabrieken, Eindhoven, Netherlands Application July 2, 1935, Serial No. 29,571
In Germany July 30, 1934

2 Claims. (Cl. 18—55)

My invention relates to a method of manufacturing elongated tubular moldings from a freely-flowable molding material capable of being hardened.

The usual method of making tubular moldings is by placing moldable material at the bottom of a mold or matrix provided with a cavity and lowering into the cavity a mandrel, which forces the moldable material upwards to fill the space formed between the mandrel and the wall of the cavity. Such a method has the disadvantage that the mandrel may be deflected by the upward forces exerted thereupon by the moldable material, as well as by the incidental lateral forces produced by the irregularities in the flow of the moldable material. The extent of such deflections increases with decreasing cross sections of the mandrel, and due to such deflections of the mandrel the channel produced in the molding, especially in the case of small cross-section mandrels, is not always accurate.

Furthermore, when making moldings the channel of which should be open at both ends, one end of the channel frequently becomes partially or entirely closed with a thin layer of the moldable material, which layer must be removed by a separate operation.

In accordance with my invention the above disadvantages are eliminated by centering the mandrel at both ends before pressure is exerted on the moldable material. More particularly one end of the mandrel is centered by the plunger which acts on the moldable material, and the other end of the mandrel is centered in a guide bore at the bottom of the cavity; the plunger and the latter end of the mandrel being centered and guided in the mold before the plunger begins to press the moldable material. After the mandrel has been so centered, further downward pressure of the plunger causes the moldable material to flow into the space formed between the mandrel and the mold.

In the method according to the invention, the moldable material is prevented from coming into contact with the end surface of the mandrel and therefore cannot exert any upward pressure thereon. On the contrary, the flowing moldable material exerts a stretching action upon the mandrel, which tends to maintain same in its proper position. This results in very accurate tubular moldings and at the same time the channels or bores of the moldings have clean openings at both ends and no removal of excess material to clean the ends is necessary.

In order that the invention may be more clearly understood and readily carried in to effect, it will be more fully described in connection with the accompanying drawing, in which:

Figures 1 to 3 are sectionized views of a device for carrying out the invention, and show the device at different stages of the molding operation;

Fig. 4 is a sectionized view of a modification of the device of Figs. 1 to 3.

The device shown in Figs. 1 to 3 comprises a mold 5 provided with a central cylindrical cavity 7, which forms at the top an enlarged portion 4, and at the bottom a reduced diameter portion 11. A movable member consisting of a cylindrical, plunger 1 having a flat pressing surface 3, carries integrally or as a separate member fixedly secured thereto, a mandrel 2 having the shape of the channel or bore to be formed in the molding. The mandrel 2 is preferably tapered at its end 23.

The cavity 7 has the outer shape of the molding to be produced, whereas the portion 4 is adapted to receive the end of plunger 1 with a snug fit, and portion 11 is adapted to fittingly receive the end of the mandrel 2.

Within the portion 4 and at the bottom thereof is placed an annular pellet 6 of the material to be molded, for instance a mixture of a phenol formaldehyde condensation product and a filler; the aperture 20 of pellet 6 permitting free passage of the mandrel 2.

Upon downward movement of the plunger 1, the mandrel 2 passes through the aperture 20 and enters the bore 11, and the plunger 1 enters the bore 4 and is guided thereby.

As shown in Fig. 2, before the surface 3 of the plunger 1 has contacted with the pellet 6 to press against same, the mandrel 2 enters the cavity portion 11 and is guided thereby.

Upon further downward movement of the plunger 1 and the mandrel 2, the moldable material is pressed by the plunger 1 into the space between the mandrel 2 and the surface cavity 7 to ultimately form the tubular molding 6'. The pressing operation is preferably carried out with the simultaneous application of heat. During the pressing operation the moldable material flows in the direction indicated by the arrow 21—21 and exerts a stretching action upon the mandrel 2, which tends to maintain same in its proper position. After the molding operation has been completed and the moldable material has been given the desired tubular shape, as indicated in Fig. 3, the plunger 1, together with the mandrel 2, is withdrawn and the finished molding removed from the cavity 7.

The cavity 7 and the mandrel 2, instead of being of circular cross-section, may have other desired shapes, for instance may have ellipsoidal or prismatic cross-section. Also, by providing a sufficient excess of moldable material and by limiting the downward movement of the plunger 1 so that its pressure surface 3 does not contact with the bottom of the bore 4, a flanged molding may be produced.

The device shown in Fig. 4 is similar to that shown in Figures 1 to 3, except that the mandrel 10 forms a separate piece; the plunger 9 being provided with a bore to slidably fit over the mandrel. With such device the plunger 9 is moved downwardly, whereas the mandrel 10 remains stationary. Otherwise the operation and results are similar to those described in connection with the Figures 1 to 3.

While I have described my invention in connection with specific examples and in specific applications, I do not wish to be limited thereto, but desire the appended claims to be construed as broadly as permissible in view of the prior art.

What I claim is:

1. A method of molding an elongated tubular member having a bore of small cross-section from a flowable molding material capable of being hardened, comprising the steps of laterally supporting a mandrel at each end of a cavity of a mold in a manner to leave one end thereof axially-unsupported, and pressing the material into the space between the mandrel and the walls of the cavity from only the end of the cavity opposite the axially-unsupported end of the mandrel to cause the material to flow along the mandrel in only a single direction toward the axially-unsupported end thereof while slowly moving the mandrel in the direction in which said material flows during the pressing.

2. A method of molding an elongated tubular member having a bore of small cross section from an apertured pellet of a flowable molding mixture of a filler and a resin capable of being hardened, comprising the steps of laterally supporting a mandrel at each end of a cavity of a mold in a manner to leave one end thereof axially unsupported and with the mandrel extending through the aperture of the pellet, and pressing the material of the pellet into the space between the mandrel and the walls of the cavity from only the end of the cavity opposite the axially unsupported end of the mandrel to cause the material to flow along the mandrel in only a single direction towards the axially-unsupported end thereof while slowly moving the mandrel in the direction in which the material flows during the pressing.

JEAN VISMAN.